(12) United States Patent
Goto

(10) Patent No.: US 9,366,592 B2
(45) Date of Patent: Jun. 14, 2016

(54) ARM TYPE THREE-DIMENSIONAL MEASURING APPARATUS AND DEFLECTION CORRECTION METHOD IN ARM TYPE THREE-DIMENSIONAL MEASURING APPARATUS

(71) Applicant: Mitutoyo Corporation, Kawasaki-shi, Kanagawa (JP)

(72) Inventor: Tomonori Goto, Sapporo (JP)

(73) Assignee: MITUTOYO CORPORATION, Kanagawa (JP)

( * ) Notice: Subject to any disclaimer, the term of this patent is extended or adjusted under 35 U.S.C. 154(b) by 70 days.

(21) Appl. No.: 14/546,356

(22) Filed: Nov. 18, 2014

(65) Prior Publication Data

US 2015/0143707 A1    May 28, 2015

(30) Foreign Application Priority Data

Nov. 22, 2013  (JP) ................. 2013-242409

(51) Int. Cl.
| | | |
|---|---|---|
| *G01B 5/008* | (2006.01) | |
| *G01L 5/16* | (2006.01) | |
| *G01B 21/04* | (2006.01) | |
| *G01L 5/22* | (2006.01) | |

(52) U.S. Cl.
CPC . *G01L 5/16* (2013.01); *G01B 5/008* (2013.01); *G01B 21/04* (2013.01); *G01L 5/226* (2013.01)

(58) Field of Classification Search
CPC .......... G01L 5/16; G01L 5/226; G01B 21/04; G01B 5/008
USPC ................................... 33/503, 556
See application file for complete search history.

(56) References Cited

U.S. PATENT DOCUMENTS

| | | | | |
|---|---|---|---|---|
| 8,468,869 | B2 * | 6/2013 | Ebara ................... | G01B 21/042 33/502 |
| 2005/0095877 | A1 * | 5/2005 | Granger ................ | H01R 35/04 439/11 |
| 2005/0166413 | A1 * | 8/2005 | Crampton ............. | B25J 13/088 33/503 |
| 2008/0127501 | A1 * | 6/2008 | Eaton ................... | G01B 21/047 33/503 |
| 2009/0000136 | A1 * | 1/2009 | Crampton ............. | B25J 13/088 33/503 |
| 2011/0175745 | A1 | 7/2011 | Atwell et al. | |
| 2014/0190027 | A1 * | 7/2014 | Abe ....................... | G01B 5/008 33/503 |
| 2015/0153149 | A1 * | 6/2015 | Pettersson ............. | B25J 18/00 33/503 |
| 2015/0168121 | A1 * | 6/2015 | Tait ....................... | G01B 5/008 33/503 |
| 2015/0219452 | A1 * | 8/2015 | Bridges ................ | G01B 21/042 33/503 |

* cited by examiner

*Primary Examiner* — G. Bradley Bennett
(74) *Attorney, Agent, or Firm* — Oliff PLC

(57) ABSTRACT

An arm type three-dimensional measuring apparatus includes: a multi-jointed arm mechanism including a probe in a distal end; a processing part for computing a position of the probe, the probe being manually moved; a sensor which is formed in each axis of the multi-jointed arm mechanism and detects at least a force in one predetermined direction and torques in two predetermined axial directions generated in an attitude state of the multi-jointed arm mechanism, wherein the processing part computes a deflection amount in each axis of the multi-jointed arm mechanism based on an output of the sensor and sequentially computes a position of the probe based on the deflection amount.

4 Claims, 5 Drawing Sheets

ARM TYPE THREE-DIMENSIONAL MEASURING APPARATUS AND DEFLECTION CORRECTION METHOD IN ARM TYPE THREE-DIMENSIONAL MEASURING APPARATUS

CROSS-REFERENCE TO RELATED APPLICATION(S)

This application is based upon and claims the benefit of priority from Japanese Patent Application No. 2013-242409, filed on Nov. 22, 2013, the entire contents of which are incorporated herein by reference.

BACKGROUND

1. Field of the Invention

The present invention relates to an arm type three-dimensional measuring apparatus and a deflection correction method in the arm type three-dimensional measuring apparatus, and particularly to an arm type three-dimensional measuring apparatus capable of measuring work with high accuracy even when an attitude of a multi-jointed arm mechanism is changed to change a deflection amount in each axis of the multi-jointed arm mechanism during measurement of the work, and a deflection correction method in the arm type three-dimensional measuring apparatus.

2. Description of the Related Art

An arm type three-dimensional measuring apparatus as shown in US 2011/0175745 A1 is used conventionally. This arm type three-dimensional measuring apparatus has a multi-jointed arm mechanism including a probe in the distal end, and a processing part for computing a position of the probe, and is configured to manually move the probe. In other words, this arm type three-dimensional measuring apparatus has a passive configuration in which a driving source is not had in an axis of the multi-jointed arm mechanism.

Also, this arm type three-dimensional measuring apparatus includes plural strain gauges in its arm (link) portion. As a result, such an arm type three-dimensional measuring apparatus can correct a position of the probe by detecting deflection changing by a support method of an operator or an attitude of the multi-jointed arm mechanism based on outputs of the strain gauges.

In recent years, the arm type three-dimensional measuring apparatus has used a lightweight material with small deflection in its arm (link), and has desired to detect and correct deflection in a joint part (concretely, an axis) of the multi-jointed arm mechanism rather than deflection in the link. However, the strain gauges of the arm type three-dimensional measuring apparatus as shown in US 2011/0175745 A1 are configured to detect only the deflection in the link of the multi-jointed arm mechanism, and it was impossible to detect the deflection in the axis.

SUMMARY

An object of the invention is to provide an arm type three-dimensional measuring apparatus capable of measuring work with high accuracy even when an attitude of a multi-jointed arm mechanism is changed to change a deflection amount in each axis of the multi-jointed arm mechanism, during measurement of the work, and a deflection correction method in the arm type three-dimensional measuring apparatus.

According to the invention, there is provided an arm type three-dimensional measuring apparatus including: a multi-jointed arm mechanism including a probe in a distal end; a processing part for computing a position of the probe, the probe being manually moved; a sensor which is formed in each axis of the multi-jointed arm mechanism and detects at least a force in one predetermined direction and torques in two predetermined axial directions generated in an attitude state of the multi-jointed arm mechanism, wherein the processing part computes a deflection amount in each axis of the multi-jointed arm mechanism based on an output of the sensor and sequentially computes a position of the probe based on the deflection amount.

In the invention, the sensor may be a six-axis force sensor for detecting forces in three predetermined directions and torques in three predetermined axial directions.

In the invention, all links coupled to each axis of the multi-jointed arm mechanism may be made of carbon fiber.

According to the invention, there is provided a deflection correction method in aft arm type three-dimensional measuring apparatus including: a multi-jointed arm mechanism including a probe in a distal end; and a processing part for computing a position of the probe, the probe being manually moved, the deflection correction method including: detecting at least a force in one predetermined direction and torques in two predetermined axial directions generated in an attitude state of the multi-jointed arm mechanism in each axis of the multi-jointed arm mechanism; computing a deflection amount in each axis of the multi-jointed arm mechanism based on at least the force in one predetermined direction and the torques in two predetermined axial directions; and sequentially computing a position of the probe based on the deflection amount.

According to the invention, work can be measured with high accuracy even when an attitude of a multi-jointed arm mechanism is changed to change a deflection amount in each axis of the multi-jointed arm mechanism during measurement of the work.

BRIEF DESCRIPTION OF THE DRAWINGS

The present invention will become more fully understood from the detailed description given herein below and the accompanying drawing which is given by way of illustration only, and thus is not limitative of the present invention and wherein.

DETAILED DESCRIPTION OF THE INVENTION

One example of an embodiment of the invention will hereinafter be described in detail with reference to the drawings.

The embodiment according to the invention will be described using FIGS. 1 to 4.

First, a configuration of an arm type three-dimensional measuring apparatus 100 according to the present embodiment is described.

Figure 1:
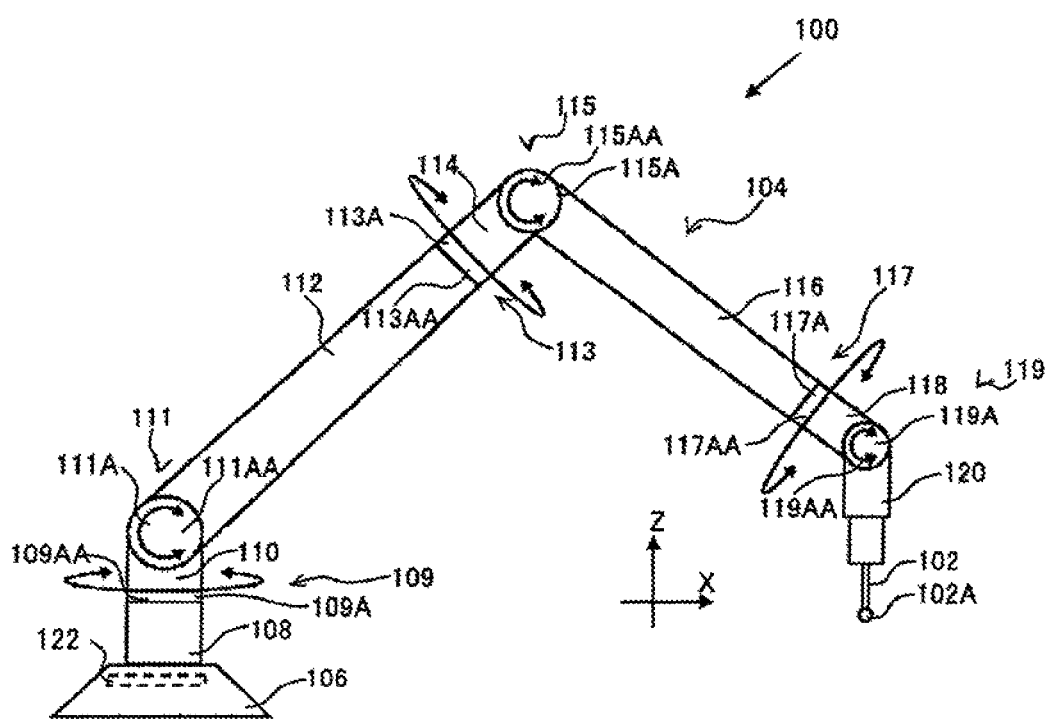
FIG. 1 is a schematic diagram showing one example of an arm type three-dimensional measuring apparatus according to an embodiment of the invention.

The arm type three-dimensional measuring apparatus 100 has a multi-jointed arm mechanism 104 and a processing part 122 as shown in FIG. 1. In addition, a processing device, a display device or an input device (not shown in the embodiment) may be connected to the arm type three-dimensional measuring apparatus 100. Also, when a three-dimensional shape of work W (not shown) is measured by the arm type three-dimensional measuring apparatus 100, an operator directly grips and operates a seventh link 120 (FIG. 1) and manually moves a probe 102. That is, the arm type three-dimensional measuring apparatus 100 has a passive configuration in which a driving source is not had in an axis of the multi-jointed arm mechanism 104. Then, the operator can bring the probe 102 near to the work W from a free direction and bring the probe 102 into contact with the work W at a free angle.

The multi-jointed arm mechanism 104 includes the probe 102 in the distal end as shown in FIG. 1. The multi-jointed arm mechanism 104 is constructed so that a first link 108 supports a second link 110 rotatably around one axis through a first joint 109 and the second link 110 supports a third link 112 rotatably around one axis through a second joint 111 and the third link 112 supports a fourth link 114 rotatably around one axis through a third joint 113 and the fourth link 114 supports a fifth link 116 rotatably around one axis through a fourth joint 115 and the fifth link 116 supports a sixth link 118 rotatably around one axis through a fifth joint 117 and the sixth link 118 supports a seventh link 120 rotatably around one axis through a sixth joint 119. And, the first joint 109 and the second joint 111, the third joint 113 and the fourth joint 115, and the fifth joint 117 and the sixth joint 119 are respectively formed rotatably in axial directions orthogonal mutually. And, an encoder a (109A) is built into the first joint 109, and an encoder b (111A) is built into the second joint 111, and an encoder c (113A) is built into the third joint 113, and an encoder d (115A) is built into the fourth joint 115, and an encoder e (117A) is built into the fifth joint 117, and an encoder f (119A) is built into the sixth joint 119, respectively. Each of the encoder a (109A) to the encoder f (119A) has a rotary type capable of defecting a rotational angle (both arrows of solid lines shown in FIG. 1 show respective rotational directions). In other words, the axis (rotational axis) of the multi-jointed arm mechanism 104 of the embodiment is set at six axes (the axis of the multi-jointed arm mechanism 104 is not limited to the six axes and may be seven axes etc.). The first link 108 is integrated with a base part 106 directly arranged on a work table etc. on which the work W (not shown) is placed (the multi-jointed arm mechanism 104 may be arranged on the work table etc. through a tripod table). The probe 102 is a contact type ball probe in which the tip (probe tip) 102A has a ball shape. In addition, all of the first link 108 to the seventh link 120 coupled to each of the axes of the multi-jointed arm mechanism 104 are made of carbon fiber, and are lightweight and have low deflection and high stiffness.

Figure 3A:
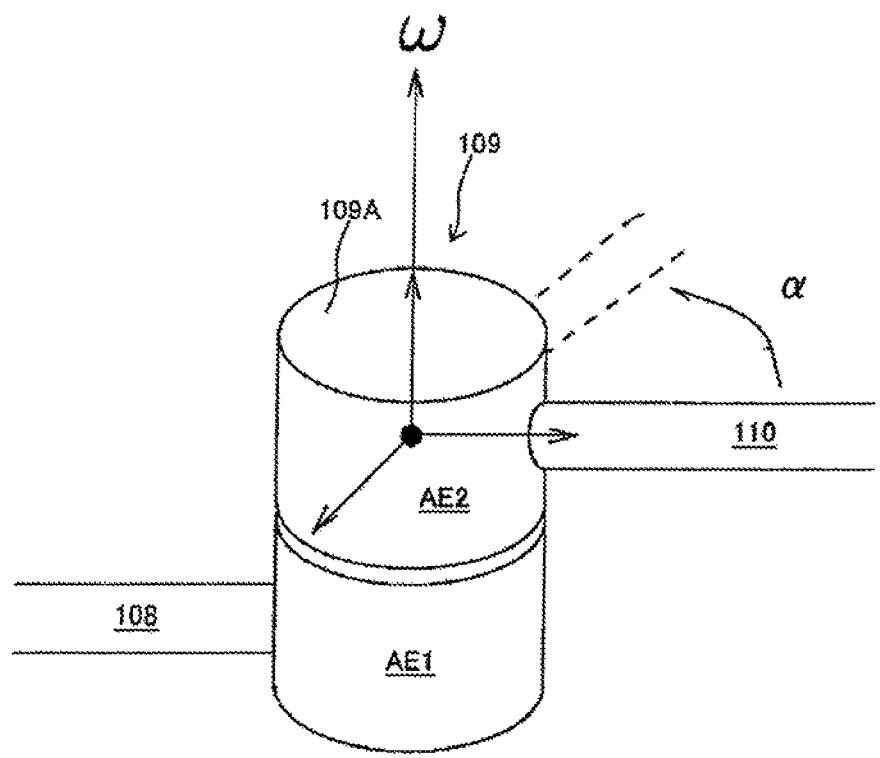
FIGS. 3A to 3C are schematic diagrams showing one example etc. of a position in which a six-axis force sensor is arranged.
Figure 3B:
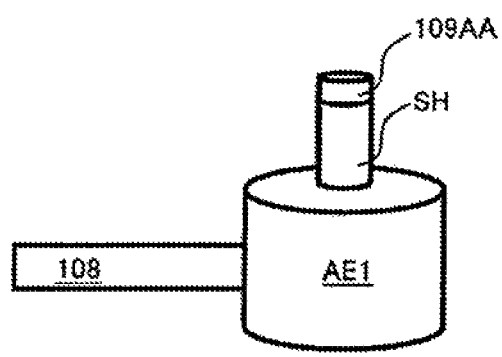
Figure 3C:
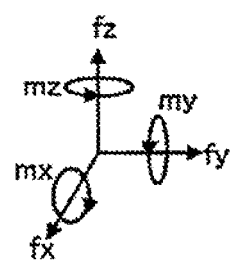

Also, the axes of the multi-jointed arm mechanism 104 are respectively provided with a six-axis force sensor a (109AA) to a six-axis force sensor f (119AA). As shown in FIG. 3C, the six-axis force sensor a (109AA) to the six-axis force sensor f (119AA) detect forces Fo (fx, fy, fz) in three predetermined directions and torques Mo (mx, my, mz) in three predetermined axial directions generated in an attitude state of the multi-jointed aria mechanism 104 (the forces Fo (fx, fy, fz) in three directions and the torques Mo (mx, my, mz) in three axial directions are also called wrenches). In the embodiment, for example, for the first joint 109, the six-axis force sensor a (109AA) is arranged in an axis SH of a shaft member AE1 for supporting a shaft member AE2 rotatably α around the ω axis in the shaft members AE1, AE2 respectively coupled to the first link 108 and the second link 110 as shown in FIGS. 3A and 3B. In addition, the encoder a (109A) is herein arranged in the side of shaft member AE2. The six-axis force sensor a (109AA) to the six-axis force sensor f (119AA) are publicly known, and a strain gauge or a photoelectric sensor is used.

Figure 2:
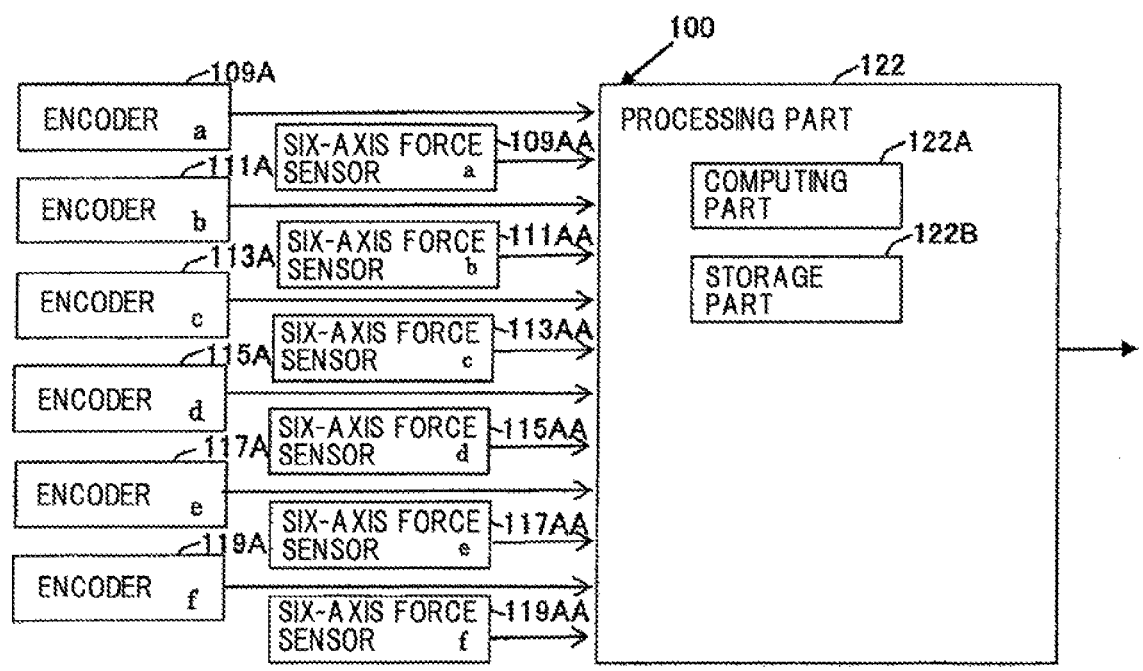
FIG. 2 is a schematic diagram showing one example of a configuration block of FIG. 1.

As shown in FIG. 1, the processing part 122 is included in the base part 106 (the processing part 122 is not limited to this, and may be formed in the outside of the arm type three-dimensional measuring apparatus 100). As shown in FIG. 2, the processing part 122 has a computing part 122A and a storage part 122B. In other words, the processing part 122 can store a result computed by the computing part 122A in the storage part 122B, or can read out data stored in the storage part 122B and compute the data by the computing part 122A. The processing part 122 is connected to the encoder a (109A) to the encoder f (119A) and the six-axis force sensor a (109AA) to the six-axis force sensor f (119AA). Here, a positional relation and lengths of the probe 102, the multi-jointed arm mechanism 104 and the base part 106 are previously clarified. And, since a shape of a ball of the probe tip 102A of the probe 102 is clarified, a position of contact between the ball and the work W can accurately be measured by performing offset processing for a radius of the ball with respect to a central coordinate value of this ball. In other words, the processing part 122 accurately computes a position of (the probe tip 102A of) the probe 102 using the base part 106 as a criterion based on outputs of the encoder a (109A) to the encoder f (119A) built into the first joint 109 to the sixth joint 119. At this time, a matrix M indicating the position of the probe tip 102A is expressed by Formula (1) using a coordinate transformation matrix $M_k^{k+1}$ (k=base, 1 to 6, end) in each rotational axis since the arm type three-dimensional measuring apparatus 100 has the multi-jointed arm mechanism 104 of the six axes.

[Mathematical Formula 1]

$$M = M_{base}^1 \cdot M_1^2 \cdot M_2^3 \cdot M_3^4 \cdot M_4^5 \cdot M_5^6 \cdot M_6^{end} \qquad (1)$$

In addition, the symbol $M_{base}^1$ indicates a coordinate transformation matrix between the base part 106 used as a criterion of a coordinate system determined on a base surface and the rotational axis of the encoder a (109A) used as the first rotational axis, and the symbol $M_6^{end}$ indicates a coordinate transformation matrix between the probe tip 102A and the rotational axis of the encoder f (119A) used as the sixth axis of the multi-jointed arm mechanism 104, respectively.

When a rotational amount and a parallel translation amount (these are called a deflection amount in the axis) of the axis by deflection and the wrenches (forces Fo in three directions and torques Mo in. three axial directions) applied to the axis are respectively set at Δθ and ΔT and a compliance matrix (inverse matrix of a stiffness matrix) of the axis is set at K herein, Formula (2) holds.

[Mathematical Formula 2]

$$\begin{bmatrix} \Delta T \\ \Delta \theta \end{bmatrix} = K \cdot \begin{bmatrix} Fo \\ Mo \end{bmatrix} \qquad (2)$$

Here, the compliance matrix K can be previously quantified (calibrated) by applying the known forces Fo and torques Mo to each axis and computing a deflection amount (a rotational amount and a parallel translation amount of the axis) at that time. Or, the compliance matrix K can be previously obtained by calculation. This compliance matrix K is stored in the storage part 122B. As a result, the computing part 122A can obtain the rotational amount Δθ and the parallel translation amount ΔT of each axis (the deflection amount in each axis) by deflection by obtaining the wrenches (forces Fo in three directions and torques Mo in three axial directions) applied to each axis based on outputs of the six-axis force sensor a (109AA) to the six-axis force sensor f (119AA) and using the compliance matrix K stored in the storage part 122B.

When a coordinate transformation matrix for implementing the rotational amount Δθ and the parallel translation amount ΔT of the nth (n=1 to 6) axis by deflection expressed by Formula (2) is set at $E_n$ herein, the matrix M indicating the position of the probe tip 102A shown by Formula (1) is changed as expressed by Formula (3).

[Mathematical Formula 3]

$$M = M_{base}^{1} \cdot E_1 \cdot M_1^2 \cdot E_2 \cdot M_2^3 \cdot E_3 \cdot M_3^4 \cdot E_4 \cdot M_4^5 \cdot E_5 \cdot M_5^6 \cdot E_6 M_6^{end} \quad (3)$$

As a result, the processing part 122 can compute a deflection amount in each axis of the multi-jointed arm mechanism 104 based on outputs of the six-axis force sensor a (109AA) to the six-axis force sensor f (119AA) and obtain the coordinate transformation matrix $E_n$ based on the deflection amount and sequentially compute the position of the probe 102 based on Formula (3). The processing part 122 sequentially computes a position of the probe 102 every time the position of the probe 102 is changed. Or, the position of the probe 102 is sequentially computed with a certain period.

Figure 4:
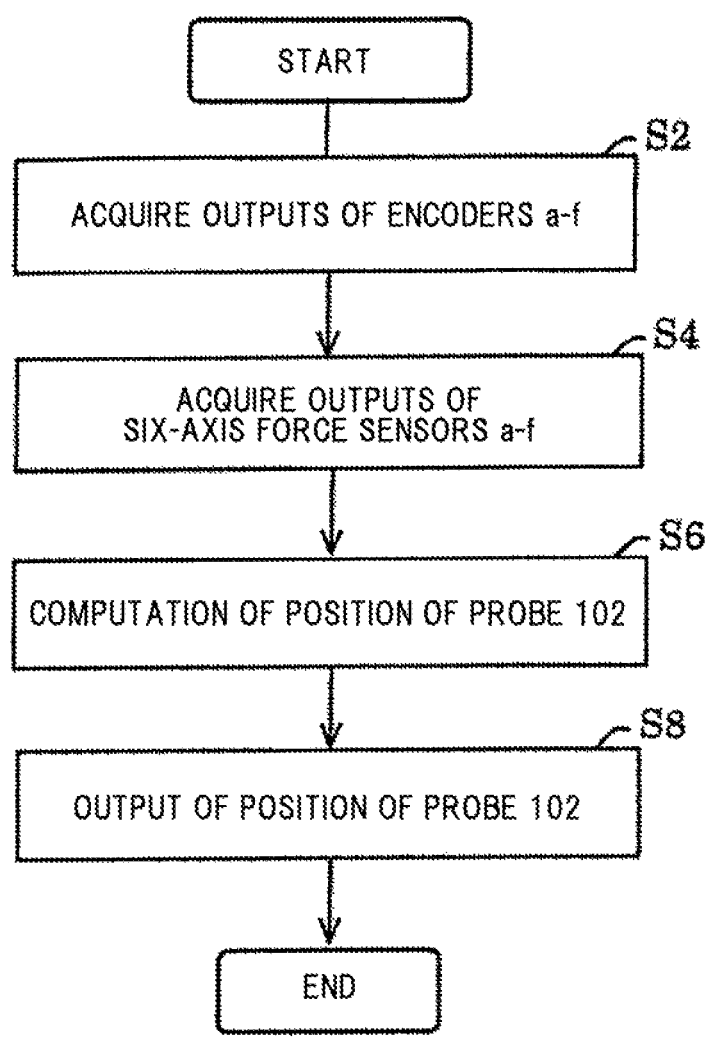
FIG. 4 is a flowchart showing one example of a procedure of processing performed by a processing part.

Next, one example of a procedure of processing performed by the processing part 122 in the arm type three-dimensional measuring apparatus 100 of the embodiment will hereinafter be described using FIG. 4.

First, the processing part 122 acquires outputs of the encoder a (109A) to the encoder f (119A) formed in each axis of the multi-jointed arm mechanism 104 (step S2). Next, the processing part 122 obtains a coordinate transformation matrix $M_k^{k+1}$ (k=base, 1 to 6, end) in each axis.

Then, the processing part 122 acquires outputs of the the six-axis force sensor a (109AA) to the six-axis force sensor f (119AA) formed in each axis of the multi-jointed arm mechanism 104 (step S4). Concretely, the computing part 122A obtains forces Fo in three directions and torques Mo in three axial directions applied to each axis based on the outputs of the six-axis force sensor a (109AA) to the six-axis force sensor f (119AA). Then, a deflection amount in each axis of the multi-jointed arm mechanism 104 is computed. Concretely, a rotational amount Δθ and a parallel translation amount ΔT of each axis by deflection by Formula (2) are obtained using the compliance matrix K stored in the storage part 122B. Then, a coordinate transformation matrix $E_n$ (n=1 to 6) for implementing the rotational amount Δθ and the parallel translation amount ΔT of each axis is obtained.

Then, a position of the probe 102 using the base part 106 as a criterion is computed (step S6). That is, the computing part 122A computes Formula (3) using the coordinate transformation matrix $E_n$ (n=1 to 6) and the coordinate transformation matrix $M_k^{k+1}$ (k=base, 1 to 6, end) obtained, and obtains a matrix M of a position of (the probe tip 102A of) the probe 102. Then, the position of the probe 102 is outputted from the processing part 122 (step S8).

Thus, in the embodiment, each axis of the multi-jointed arm mechanism 104 is provided with the six-axis force sensor a (109AA) to the six-axis force sensor f (119AA). Accordingly, a deflection amount in each axis can accurately be obtained as the rotational amount Δθ and the parallel translation amount ΔT by using the forces Fo in three predetermined directions and the torques Mo in three predetermined axial directions detected by the six-axis force sensor a (109AA) to the six-axis force sensor f (119AA). As a result, an error of the position of the probe tip 102A by deflection of the axis can be sequentially corrected to perform computation in real time using Formula (3).

Moreover, all of the first link 108 to the seventh link 120 coupled to each of the axes of the multi-jointed arm mechanism 104 are made of carbon fiber. That is, since the first link 108 to the seventh link 120 are lightweight and are resistant to deflection, the position of the probe 102 can be obtained accurately without considering the deflection amounts of the first link 108 to the seventh link 120. Of course, the position of the probe 102 can be obtained more accurately by together applying the art of US 2011/0175745 A1 and considering the deflection amounts of the first link 108 to the seventh link 120. In addition, the invention is not limited to this, and it is unnecessary to make all of the first link 108 to the seventh link 120 coupled to each of the axes of the multi-jointed arm mechanism 104 of carbon fiber. As long as the first link 108 to the seventh link 120 have a lightweight material with low deflection and high stiffness, accuracy of the position of the probe 102 can be maintained with high accuracy similar to that of the embodiment. Or, even when the first link 108 to the seventh link 120 are not made of such a material, the position of the probe 102 can accurately foe obtained accordingly since at least an error by deflection in the axis can be avoided.

That is, the embodiment can measure the work W with high accuracy even when an attitude of the multi-jointed arm mechanism 104 is changed to change a deflection amount in each axis of the multi-jointed arm mechanism 104 during measurement of the work W.

The invention has been described by giving the embodiment described above, but the invention is not limited to the embodiment described above. That is, it goes without saying that improvements and design changes can be made without departing from the gist of the invention.

For example, in the embodiment described above, the probe 102 is the ball probe as shown in FIG. 1, but the invention is not limited to this ball probe. For example, the probe 102 may be a contact type probe such as a touch signal probe. Or, the probe 102 may be, for example, a non-contact type probe using a line laser etc.

Also, in the embodiment described above, the sensor formed in each axis is respectively the six-axis force sensor a (109AA) to the six-axis force sensor f (119AA), but the invention is not limited to this. For example, the sensor formed in each axis could be configured to detect at least a force in one predetermined direction and torques in two predetermined axial directions even when the embodiment does not have six axes. Also in that case, the deflection amount in each axis can be corrected accordingly.

The invention can be widely applied to an arm type three-dimensional measuring apparatus having a multi-jointed arm mechanism including a probe in the distal end, and a processing part for computing a position of the probe, the probe being manually moved.

What is claimed is:

1. An arm type three-dimensional measuring apparatus comprising:
   a multi-jointed arm mechanise including a probe in a distal end;
   a processing part for computing a position of the probe, the probe being manually moved;
   a sensor which is formed in each axis of the multi-jointed arm mechanism and detects at least a force in one predetermined direction and torques in two predetermined axial directions generated in an attitude state of the multi-jointed arm mechanism, wherein the processing part computes a deflection amount in each axis of the multi-jointed arm mechanism based on an output of the sensor and sequentially computes a position of the probe based on the deflection amount.

2. An arm type three-dimensional measuring apparatus according to claim 1, wherein
the sensor is a six-axis force sensor for detecting forces in three predetermined directions and torques in three predetermined axial directions.

3. An arm type three-dimensional measuring apparatus according to claim 1, wherein
all links coupled to each axis of the multi-jointed arm mechanism are made of carbon fiber.

4. A deflection correction method in an arm type three-dimensional measuring apparatus including: a multi-jointed arm mechanism including a probe in a distal end; and a processing part for computing a position of the probe, the probe being manually moved, the deflection correction method comprising:
detecting at least a force in one predetermined direction and torques in two predetermined axial directions generated in an attitude state of the multi-jointed arm mechanism in each axis of the multi-jointed arm mechanism;
computing a deflection amount in each axis of the multi-jointed arm mechanism based on at least the force in one predetermined direction and the torques in two predetermined axial directions; and
sequentially computing a position of the probe based on the deflection amount.

* * * * *